United States Patent [19]  
Thomas et al.

[11] Patent Number: 4,636,780  
[45] Date of Patent: * Jan. 13, 1987

[54] ACOUSTIC MONITORING OF CUTTING CONDITIONS TO DETECT TOOL BREAK EVENTS

[75] Inventors: Charles E. Thomas, Scotia; Minyoung Lee, Schenectady; James F. Bedard, Schenectady; Steven R. Hayashi, Schenectady, all of N.Y.

[73] Assignee: General Electric Company, Schenectady, N.Y.

[*] Notice: The portion of the term of this patent subsequent to Jan. 13, 2004 has been disclaimed.

[21] Appl. No.: 664,188

[22] Filed: Oct. 24, 1984

[51] Int. Cl.⁴ .............................................. G08B 21/00  
[52] U.S. Cl. .................................... 340/680; 340/683; 73/104; 73/660  
[58] Field of Search ........................ 340/680, 683, 679; 364/475, 507, 508, 550, 551; 73/104, 660, 593, 658

[56] References Cited  
U.S. PATENT DOCUMENTS 3,793,627  2/1974  Darrel et al. ........................ 340/680  
3,842,663 10/1974  Harting et al. ....................... 73/67.2  
4,087,801  5/1978  Noh ..................................... 340/680  
4,332,161  6/1982  Kakino ................................. 73/104  
4,413,507 11/1983  Drew et al. ........................... 73/104  
4,471,444  9/1984  Yee et al. ............................. 364/475  
4,514,797  4/1985  Begin ................................... 340/680

FOREIGN PATENT DOCUMENTS  
52-48183  4/1977  Japan ..................................... 73/104

Primary Examiner—James L. Rowland  
Assistant Examiner—Jeffery A. Hofsass  
Attorney, Agent, or Firm—Donald R. Campbell; James C. Davis, Jr.; Paul R. Webb, II

[57] ABSTRACT

This tool break detection system relies on monitoring changes in the cutting noise itself, rather than detecting the tool fracture acoustic signal. A broken tool capable of damaging the workpiece is detected, and tool break events that do not affect cutting conditions are ignored. The signal from a sensor such as an accelerometer is preprocessed to attenuate low frequency machinery noise and detect the signal energy in a band below 100 KHz, then sampled, and the digitized signal samples analyzed by pattern recognition logic. Runout false alarms during rough surface cutting are prevented; after detection of an abrupt increase or decrease in signal level, the confirmation period to test for a persistent shift in mean level is set longer than the workpiece revolution period.

12 Claims, 8 Drawing Figures

ACOUSTIC MONITORING OF CUTTING CONDITIONS TO DETECT TOOL BREAK EVENTS

BACKGROUND OF THE INVENTION

This invention relates to a tool break detector and a method of monitoring vibrations produced by machining operations to detect changes in cutting conditions resulting from a broken tool.

Breakage of cutting tool inserts and subsequent damage to the workpiece and/or the machine tool is one of the major problems that must be solved before automation of machining can be successful. Tool breaks that lead to workpiece and machine tool damage must be either prevented by the use of undesirably conservative, low productivity metal cutting rates or must be automatically detected, if close human supervision of the machining process is not available at all times. The automatic tool break detection system should reliably find almost all tool breaks that can damage the workpiece or machine tool, but should not alarm on many other tool breaks that do not significantly affect the machining process, or on any of a variety of potential false alarm sources. Tool break detection needs to be rapid so that tool feed can be controlled to prevent and limit damage.

One class of tool break detectors is based upon the resulting changes in machining power and forces. Another type is based on detecting the acoustic emissions generated by fracture of the tool insert. The current invention employs a different acoustic sensor, such as an accelerometer, and operates in the range of 30–100 KHz, below the usual acoustic emission frequency band.

The machine tool monitor in concurrently filed application Ser. No. 664,189, C. E. Thomas et al, "Acoustic Detection of Tool Break Events in Machine Tool Operations", uses the same sensor and analog signal processing as this invention and avoids false alarms on insignificant tool break events that do not affect cutting conditions. However, that approach assumes that tool insert fracture will be immediately followed by a detectable change in cutting noise or the break event will not affect the workpiece. It therefore generally relies on detecting the tool fracture signal before checking for a cutting noise signal change. The digital pattern recognition circuitry makes a three step check of the processed vibration signal before generating a major tool break alarm. A transient increase in signal level that may have its source in a break event triggers a mean shift detector to check for a change in cutting noise; if the mean shift persists for a given period the alarm is set off. It handles the case of high cutting noise masking the fracture signal by setting the tool fracture or transient detector sensitive enough to frequently trigger the cutting noise change or mean shift detector on high cutting noise peaks. The cutting noise change detector is triggered only on positive-going signal transients.

SUMMARY OF THE INVENTION

This machine tool monitor and method relies primarily upon detection of the effect of the tool break on cutting noise rather than the acoustic emission caused by sudden cracking of the tool material. A sustained cutting noise level shift test is triggered by an abrupt substantial increase or decrease in processed vibration signal level. While the trigger can be produced by detection of the positive-going tool fracture signal pulse, it is also produced by abrupt substantial changes in cutting noise levels, either up or down, when the tool fracture pulse either was not detected or was detected and dismissed because it was not immediately followed by a cutting noise level shift.

The components of the system include a broadband vibration sensor, such as an accelerometer which is most sensitive to frequencies around a resonant frequency, positioned on the machine tool to sense vibrations at the tool-workpiece interface during the machining process. An analog preprocessor for the sensor signal is comprised of means to discriminate against lower frequency machinery noise, and a rectifier and low-pass filter to detect the signal energy in an acoustic frequency band between 30 KHz and 100 KHz. The 500 Hz or less cutoff frequency of the low-pass filter prevents aliasing from the subsequent sampling operation. The unipolar output signal of the analog preprocessor is sampled, and the samples converted to digital form and analyzed by digital pattern recognition circuitry, which may be a programmable general purpose computer.

Analysis of the digitized signal samples is in two basic phases. The digital circuitry calculates the running mean signal level of a selected number of samples. In the first phase every new sample is compared with the running mean to search for an abrupt transient increase or decrease in the vibration signal. Each detection triggers the second phase. When the shift in signal level and abrupt change in cutting conditions persists for a minimum confirmation period, a tool break alarm is generated. A short transient not related to a significant tool break event is rejected, and control is returned to the transient detector to search for abrupt changes in signal level. To prevent false alarms during rough surface cutting (alternate metal-cutting and air-cutting), the confirmation period is longer than the workpiece revolution period. The ability to alarm on valid tool breaks during runout is retained.

An object of the invention is a tool break detection system which has faster response and greater sensitivity than power and force monitoring devices, and is less expensive and time consuming to set up and operate, since these systems must be carefully adjusted for each cut in the parts program.

Another object is to provide a broken tool detector that is less subject to false alarms than existing acoustic emission detection systems and avoids alarming on tool break events that do not significantly affect cutting conditions.

Yet another object is the provision of some capability of adjusting tool break detection sensitivity to meet the varying needs of different machining operations.

A further object is to provide useful tool break detection performance over a wider range of machining applications than known power, force and acoustic emission monitoring systems.

A still further object is to provide an improved, more sensitive acoustic tool break detection system that does not false alarm during rough surface cutting.

Another object is such a broken tool detector that is easily integrated with an acoustic tool touch detector in a combined system.

DETAILED DESCRIPTION OF THE INVENTION

Figure 1:
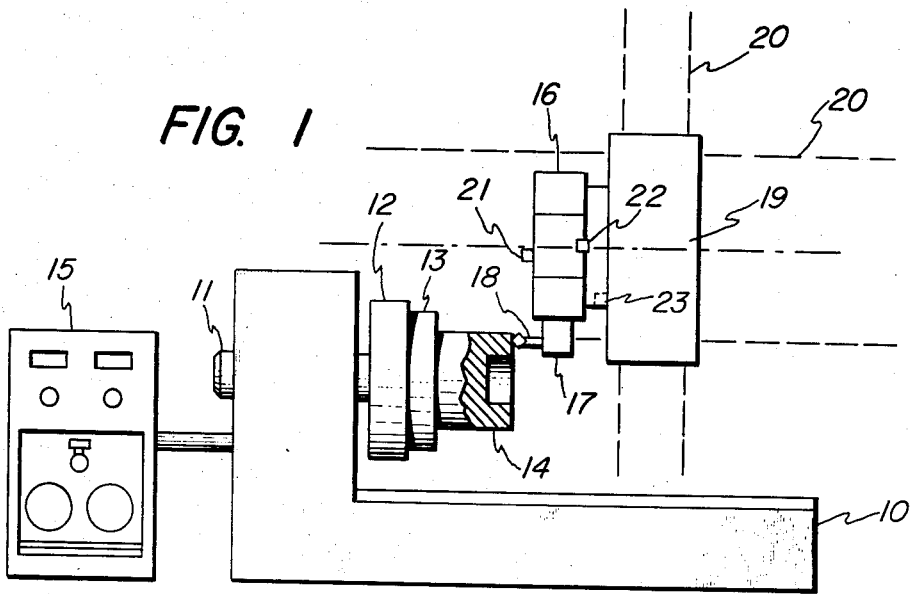
FIG. 1 is a partial elevational view of a horizontal turret lathe showing alternative positions of the accelerometer.

The version of the machine tool monitor tool break detector in Ser. No. 664,189 analyzes the vibration signals and separates those signal signatures caused by significant tool break events from those caused by either spurious noise sources or insignificant tool break events, and does this successfully over a limited range of machining conditions. The present technique expands the range of machining conditions over which successful tool break detection is obtained. Some of the machining conditions that affect the nature of the tool break vibration signature and spurious noise characteristics are: the type and precise composition of the insert material; the shape of the insert and other geometry factors; methods of mounting the insert in the tool holder including material and geometry of the tool seat and use of a chip breaker; chatter; depth of cut, feed rate and spindle speed; roughness of the workpiece surface, including surface scale and previously machined holes; workpiece material; and cut discontinuities at the inside and outside corners.

In general, a tool break event produces a vibration signature with two parts, an acoustic emission in the form of one or more short spikes caused by the sudden cracking of the insert material, and a change in the cutting noise signal due to a change in the cutting conditions caused by the broken insert cutting differently from the unbroken insert.

Concerning the first, acoustic emission caused by cracking of the insert, the change in the state of the insert may or may not change conditions at the cutting edge. Cutting conditions may remain unchanged if:

(a) The cracking is limited to internal crack growth, with no effect on the exterior surface of the insert;
(b) The cracking extends through the exterior surfaces of the insert but the separate pieces of the cracked insert are prevented from falling away by the compressive forces of the insert mounting arrangements and the cutting process;
(c) The cracking causes a piece of the insert to fall away, but the piece does not involve the cutting edge and does not jam against the workpiece.

Concerning the second, a change in cutting noise signal due to a change in cutting conditions, these cutting condition changes may be:

(a) Reduced depth of cut due to loss of part of the insert;
(b) Increased depth of cut due to a piece broken from the insert jamming against the workpiece;
(c) Increased workpiece surface roughness due to a jagged edge on the broken insert.

The definitions of a significant or major tool break vary with the objectives of the operator and the nature of the parts he makes, including such factors as roughing, intermediate or finish cuts, degree of human supervision available, value of the machined part, etc. However, it is usually the case that only a break that threatens immediate damage to the part or tool holder, or would force a recut, is considered significant. The tool break detector should ignore other tool breaks to avoid unnecessary interruptions of the cutting process, and consequent reduced productivity.

The mounting location of the vibration sensor for tool break detection is determined individually for each machine tool to be monitored. The considerations are the same as for a tool touch detector and are fully explained in copending application Ser. No. 645,203, filed Aug. 29, 1984, C. E. Thomas et al., "Acoustic Detection of Contact Between Cutting Tool and Workpiece". The sensor is mounted in good acoustic contact with a part of the machine tool sufficiently closely mechanically coupled to the tool holder so that vibrations generated at the tool-workpiece interface during the machining operation can be readily sensed. The machine tool monitor tool break detector uses a single sensor that is small and rugged and may be mounted a reasonable distance from the tool-workpiece interface. In contrast, many other prior tool break detection systems require multiple sensors and sensors mounted close to the cutting insert, where the environment is severe, only one tool position of a multiple-position machine can be serviced with one sensor, and sensor installation may not be a simple process.

Figure 2:
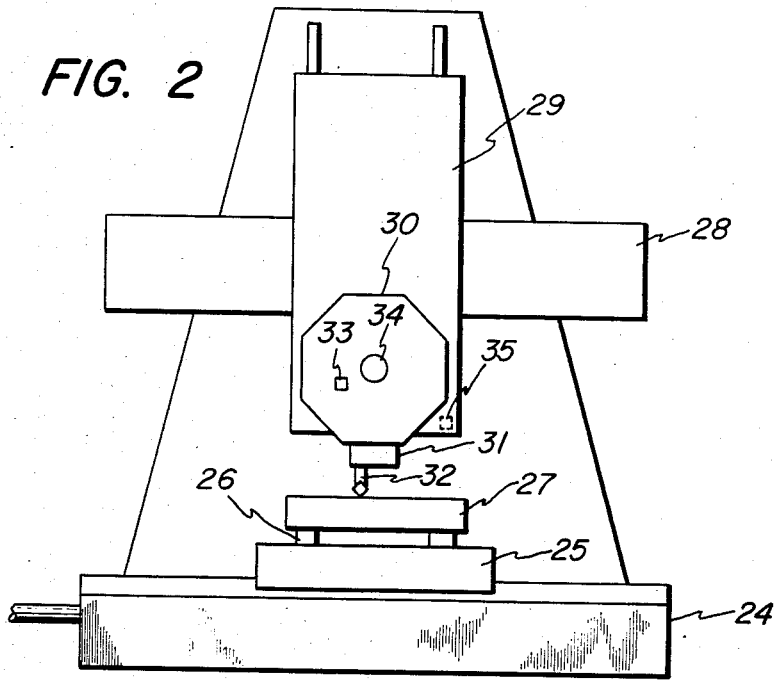
FIG. 2 is a simplified elevational view of a vertical turret lathe and alternative sensor positions.

FIGS. 1 and 2 are simplified drawings of horizontal and vertical turret lathes; the monitor has some applicability to other types of machine tools such as milling machines, machining centers, and drills. The portion of the horizontal turret lathe illustrated has a machine frame 10, spindle shaft 11, chuck 12, fixture 13 for holding the workpiece 14, and a NC control station 15. A rotatable tool turret 16 has several tool posts 17 to support the tool holder and insert 18. The turret 16 is supported on a turret mount 19 which in turn has movement along the two cross slides 20. A vibration sensor 21 such as a broadband accelerometer is mounted on turret 16; thus a single sensor in a single mounting position can monitor any tool holder position the operator selects for the cutting operation. This mounting location will usually provide a satisfactory signal to noise ratio for spurious noise. Since the turret can be rotated, and in many machines only in one direction, the sensor cannot be electrically connected to stationary signal processing electronics through simple cables. A rotating electrical coupler 22 is one way of transferring the electrical signal outputted by the transducer. Optionally, the vibration sensor 23 is mounted on the cross slide where no rotating coupler is required and tests have shown that good operation is obtained on some lathes. Whether the sensor can be mounted off the turret is a matter that must be experimentally determined on each machine to be monitored.

A vertical turret lathe is illustrated in FIG. 2 and two suitable vibration sensor mounting locations are shown. The parts illustrated are: the machine frame 24, chuck 25, work holding fixture 26, workpiece 27, cross slide 28, vertical slide 29, rotatable tool turret 30, tool post 31, and tool holder and cutting insert 32 (the numerical control unit is not shown). The vibration signal generated by turret-mounted sensor 33 is transmitted through the rotating electrical coupling 34 to the tool break detection circuitry. An alternative mounting location is on one of the machine tool slides; sensor 35 is in good acoustic contact with vertical slide 29.

Figure 3:
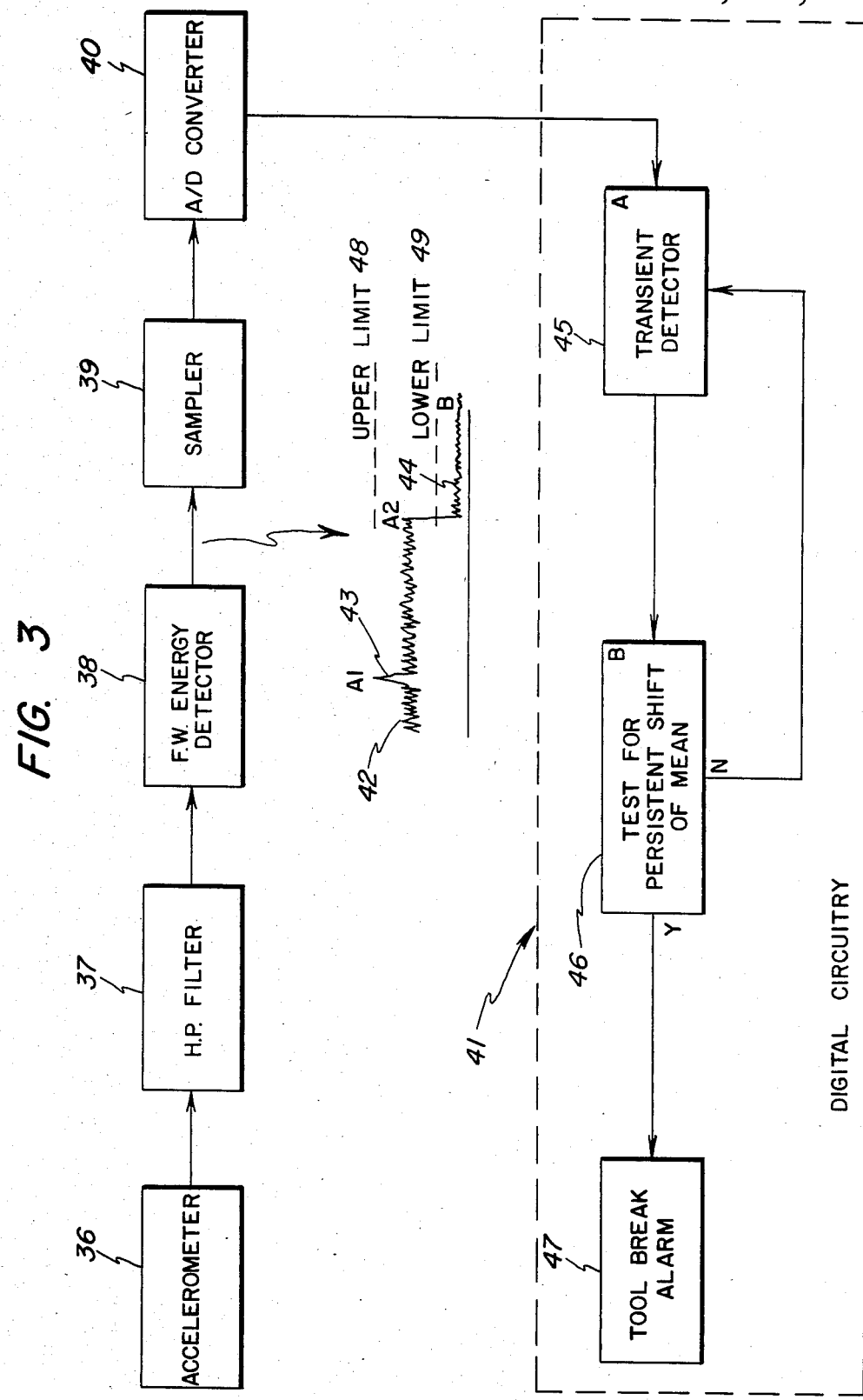
FIG. 3 is a block diagram of the tool break detection system and shows a filtered unipolar vibration signal that initially dismisses a trigger and subsequently results in a tool break alarm.

The main features of the tool break detection system which utilizes acoustic vibrations in the 30 to 100 KHz region and employs pattern recognition techniques to distinguish from background noise the effects of tool break events, are indicated in FIG. 3. The sensor is a broadband accelerometer 36 with a flat response from very low frequencies to just below its resonant frequency in the vicinity of 30 KHz and above. This resonance is lightly damped, so the sensor is most sensitive to frequencies within a few kilohertz of its resonance, and sensitivity falls rapidly for frequencies much above the resonant frequency. One such high frequency vibration sensor is the Vibrametrics VM1018 accelerometer (Vibra-Metrics, Inc., Hamden, CT). The vibration signal is high-pass filtered in a filter 37 with a cutoff frequency slightly below the resonant frequency of the sensor to discriminate against and attenuate high amplitude machinery noise which tends to be concentrated at lower frequencies. The combination of the resonant accelerometer and the high-pass filter produces a bandpass filtering of the vibration signals that favors frequencies in about a 20 KHz band in the vicinity of the accelerometer resonance frequency.

A full wave rectifier and low-pass filter combination acts as a full wave energy detector 38 (the filtering is too heavy for true envelope detection), converting the bipolar sensor signal to a unipolar "envelope" signal. The cutoff frequency of the low-pass filter is typically 500 Hz or less to prevent aliasing from the subsequent sampling operation as long as the sampling frequency is well above the 1 KHz Nyquist frequency. Thus, the sampling period can be long enough to accomplish the necessary digital analysis of the signal between analog signal samples. The cutoff frequency of the low-pass filter in fact may be as low as 100 Hz. The signal samples of the output of the analog signal processing, extracted by sampler 39, are next converted to digital form by the analog-to-digital converter 40 and are further processed and analyzed by digital circuitry 41, which may be in the form of a programmable general purpose computer.

The illustrated filtered unipolar signal at the output of the analog preprocessor contains a significant tool break vibration signature. The background cutting noise level prior to any hint of a tool break is indicated at 42. A positive-going transient 43 may be produced by fracture of the cutting insert, but the cutting noise level is unchanged and there is no tool break alarm because compressive forces on the cracked insert parts maintained cutting conditions unchanged for a duration longer than the break suspicion confirmation period. This is followed by an abrupt, sustained decrease in mean signal level. The decreased cutting noise signal level 44 is due to a reduced depth of the cut after a portion of the insert including the original cutting edge breaks away. There is no positive-going transient closely associated in time with the abrupt signal level decrease. The acoustic emission signal from the insert cracking may have been obscured by a high level of normal cutting noise, or it may have produced the positive-going transient 43 that was detected and rejected earlier. Proper detection of this type of tool break signature is realized by broadening the break suspicion criterion to include substantial abrupt signal level decreases as well as increases.

Figure 4:
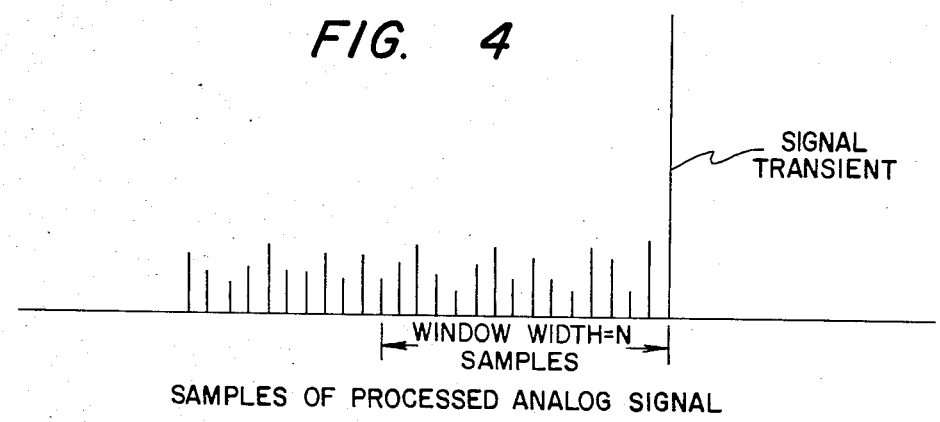
FIG. 4 illustrates the sampled signal and the "running mean" window.

As indicated in FIG. 3, the analysis of the digital signal samples is in two basic phases. In the first phase, carried out in transient detector 45, any abrupt transient increase or decrease in the vibration signal level is detected, and each detection triggers the second phase. This is performed by the mean shift persistence test circuitry 46. If the change in vibration signal level is a short transient, it is rejected in this second phase, and control is returned to the first phase, which resumes looking for abrupt changes in level. When the change in vibration signal level is persistent, the second phase recognizes this and generates a broken tool alarm 47. The phase 1 transient detection criterion is based primarily on detection of a single signal sample that is either greater or less than the current running mean signal level by a factor great enough to indicate it is probably beyond the range of the normal peaks and valleys of that signal that result from its noise-like character (restricted by the filtering of the analog signal processing channel). Other secondary criteria that must also be met are included to avoid false alarms on low-level transients. Every new signal sample is compared with the mean signal value for the previous N samples, where N is the number of samples in a "running window" used for computing a running mean signal level. FIG. 4 illustrates the digitized samples of the processed analog signal and the "running mean" window. Typically, N would be 16. The presence of an abrupt increase or decrease in the vibration signal may indicate an abrupt change in cutting noise resulting from a change in cutting conditions, and may have its source in a significant tool break event.

The phase 2 level shift persistence criterion continually compares the signal mean level after the trigger with that at the time of the trigger. When the post-trigger mean, after detection of an abrupt signal change, remains outside amplitude acceptance limits for a minimum confirmation period, a tool break alarm is generated. The upper and lower acceptance limits 48 and 49 shown in FIG. 3 are typically 50% above and below the mean cutting noise signal level. These limits are fixed for a given cut, and are user-selectable and may be put into the parts program. If, at any time during the confirmation period, a specified minimum number of post-trigger means inside the amplitude acceptance limits is accumulated, the detected abrupt transient is rejected as non-tool break related, and control is returned to phase 1. FIG. 3 shows a trigger by the positive-going signal transient 43 that is not confirmed at A1. At A2 there is a second trigger by the negative-going signal transient which is confirmed at B, where a broken tool alarm is generated.

Figure 5:
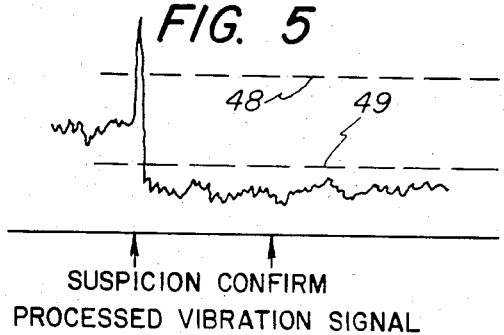
FIGS. 5 and 6 illustrate processed analog vibration signals which contain significant tool break signatures and generate an alarm.
Figure 6:
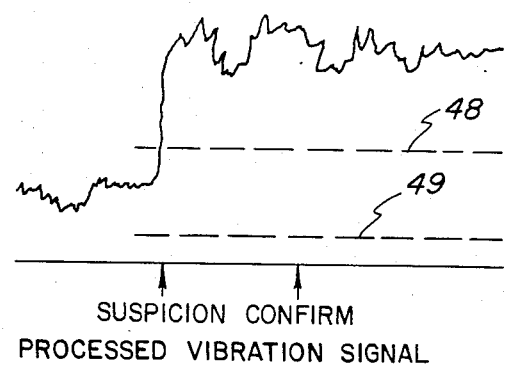

In FIGS. 5 and 6 are two other types of vibration signatures which tests have shown to be associated with significant tool break events, where the signals being analyzed are the filtered unipolar outputs of the analog signal channel. The improved tool break detection system alarms on these and other vibration signal patterns that satisfy the two criteria. The processed vibration signal in FIG. 5 has a short positive-going signal transient well above the previous mean signal level, followed by a sustained drop in mean signal level. The amplitude acceptance limits of the post-trigger signal are indicated by dashed lines. The positive signal transient may be the acoustic emission from the cracking insert, or it may be due to a momentary jamming of a broken piece of insert against the workpiece. The sustained drop in mean signal is usually due to a substantial reduction in depth of cut after part of the insert breaks away. The positive-going transient meets the "break suspicion" or transient detect criterion of the computer logic, and the sustained drop in mean signal level meets the "suspicion confirmed" or persistence test criterion.

The tool break vibration signature in FIG. 6 is characterized by an abrupt, sustained increase in mean signal level. The increase may be due to jamming of a broken piece of the insert between the remainder of the insert and the workpiece, or to cutting with a jagged edge of the insert. The cracking event acoustic emission pulse is obscured by the high level of abnormal cutting noise. The probability of tool fracture signal detectability is lowest in the high cutting noise generally associated with high speed ceramic tool cutting of hard metals like Inconel. The abrupt rise in signal level meets the "break suspicion" and transient detect criterion, and the sustained high signal level meets the "suspicion confirmed" and persistence check criterion.

The improved tool detection system does not alarm on the vibration signature types shown in two figures of Ser. No. 664,189. The first has a short positive-going transient followed by a return to the previous mean signal level; cutting conditions are not affected. The second has a longer positive-going transient followed by a return to previous signal levels. The transient may be caused by a small chip breaking off the insert and momentarily jamming against the workpiece; it clears before significant damage is done and thereafter cutting conditions are not affected. The persistence confirmation criterion is not met. Thus resistance to unnecessary alarms on insignificant tool break events is obtained.

Tool break detectors that monitor and interpret cutting noise for changes caused by tool break events can be confused by cutting noise perturbations produced on initial cuts on rough surfaces with a good tool. This system prevents false alarms on such cuts while still permitting alarming on major tool break events that occur at any time, including during rough surface cuts. Initial machining cuts on rough surfaces from prior casting or forging operations are characterized by abrupt changes in depth of cut including air-to-metal-to-air transitions. This, in turn, produces abrupt changes in cutting noise level including drops to traverse noise levels. False alarm prevention is needed because of this problem of signal level shifts that occur abruptly once or more per workpiece revolution due to "runout" in initial cuts on rough surfaces. Such abrupt transitions have many of the characteristics of valid tool break signatures. Disabling the tool break detector on rough cuts is not desirable because tool break events are more common under rough cutting conditions. Having a human monitor watch for tool breaks during rough surface cutting is not an attractive solution in many cases because some parts programs involve rough surface cutting on most cuts.

Figure 7:
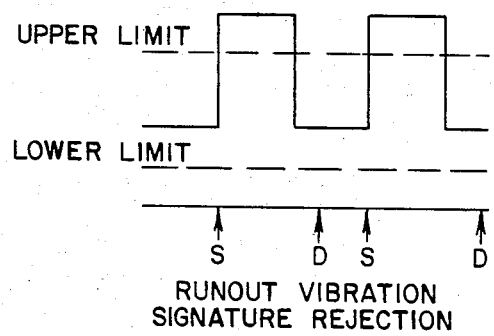
FIGS. 7 and 8 illustrate cyclically varying vibration signals produced by runout variation in depth of cut that are rejected as false alarms.
Figure 8:
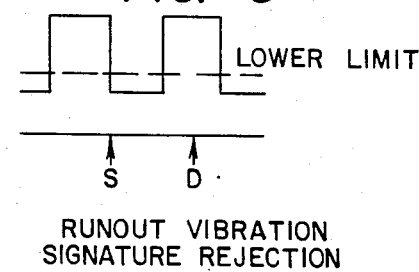

Runout false alarms are prevented by adjusting the phase 2 persistent mean shift confirmation period to be longer than a workpiece revolution period and rejecting signal level shifts that do not persist at least one full revolution. FIG. 7 shows a cyclically varying signal level such as might be produced by runout variation in depth of cuts. At point S, the abrupt increase triggers a "suspicion" check and holds the current mean signal as a reference. The vibration signal goes above the upper acceptable limit, but returns before the confirmation period ends, so the "suspicion" is dismissed at D. Control is returned to phase 1 to search for another abrupt signal increase or decrease. This repeats each cycle because the confirmation period is a little longer than the spindle revolution period. FIG. 8 shows that a similar result obtains if the initial "suspicion" occurs on the abrupt decrease in signal level as the depth of cut decreases. The vibration signal level goes below the lower amplitude acceptance limit but returns before the confirmation period ends. The trigger is dismissed at D. The system alarms on significant tool breakage because the abrupt change in signal level, whether up or down, persists for longer than the confirmation period.

The invention can be implemented with user-selectable parameters to adjust tool break detection sensitivity to meet the varying needs of different machining operations. For one example, on rough cuts the user may not wish to stop a cut for a tool break that changes depth of cut by a substantial amount but not enough to endanger the tool holder, whereas on finish cuts he may wish to stop the cut for a tool break that causes only a small change in depth of cut. Since there is a rough correlation between depth of cut change and change of cutting noise signal level, the user may want to set the level shift acceptance limits (48 and 49 of FIG. 5) closer together for finish cuts than for rough cuts.

For a second example, the confirmation period can be set long enough to prevent runout false alarms at the slowest spindle speed to be used on any cut. However, an unnecessarily long confirmation period increases the chance of dismissal of a true tool break due to the tool seat contacting the workpiece and increasing the cutting noise level after it has been lowered by removal of part of the tool insert. The user can reduce the probability of this dismissal of tool breaks by setting the confirmation period shorter when cutting conditions do not involve runout, or when spindle speed is high.

With its emphasis upon monitoring changes in the cutting noise itself, rather than just detection of the tool fracture acoustic signal, the improved system is philosphically closer to schemes that monitor changes in machining power or forces than it is to any other known acoustic tool break detection system. It addresses some of the special problems associated with tool break detection in machining operations using high speed ceramic tool inserts. It is readily integrated with the acoustic tool touch detector of application Ser. No. 645,203 in a combined tool break and touch detection system, in that the sensor and analog signal processing are almost the same and the fundamental difference resides in how the digitized signal samples are analyzed and the nature of the pattern recognition logic. The improved acoustic broken tool detector may be used with an automatic tool changing system, and as a stand-alone product or an option in a numerical machine tool control.

While the invention has been particularly shown and described with reference to preferred embodiments thereof, it will be understood by those skilled in the art that various changes in form and details may be made without departing from the spirit and scope of the invention.

What is claimed is:

1. A system for detecting cutting tool break events while machining a workpiece comprising:
 a broadband vibration sensor which generates an electrical signal representing vibrations at the tool-workpiece interface;
 an analog preprocessor including means to discriminate against lower frequency machinery noise and to detect the signal energy in an acoustic frequency band below 100 KHz;

means for sampling the unipolar output signal of said analog preprocessor and converting each sample to a digital value; and digital pattern recognition circuitry to detect changes in cutting conditions due to tool break events that can cause damage, comprising means for calculating the running mean signal level of a selected number of samples, means for comparing each sample with the running mean to search for an abrupt transient increase or decrease in sample signal level resulting from a substantial change in cutting noise, and means for comparing the mean signal level after detection of an abrupt change with that before detection and generating a tool break alarm when the shift in mean and change in cutting noise persists for a minimum confirmation period.

2. The system of claim 1 wherein said vibration sensor is an accelerometer which has a resonant frequency above 30 KHz.

3. The system of claim 2 wherein said analog preprocessor is comprised of a high-pass filter, rectifier, and low-pass filter providing anti-aliasing filtering at the signal sampling rates of said sampling means.

4. The system of claim 3 wherein the cutoff frequency of said low-pass filter is less than 500 Hz.

5. The system of claim 1 wherein said last-mentioned means compares each new signal sample with amplitude acceptance limits and dismisses a detected abrupt change in signal level as non-tool break related when a given number of signal samples are inside said acceptance limits.

6. The system of claim 1 where said confirmation period is longer than the workpiece revolution period to prevent false alarms during rough surface cutting.

7. A system for detecting cutting tool break events while machining a workpiece comprising:

a broadband accelerometer which is most sensitive to frequencies around a resonant frequency and is positioned on a machine tool to sense vibrations at the tool-workpiece interface and convert these and other vibrations to an electrical signal;

analog signal processing means including means for high-pass filtering said vibration signal to discriminate against lower frequency machinery noise, and means to rectify and low-pass filter said signal to detect the signal energy in an acoustic frequency band between 30 KHz and 100 KHz;

means for sampling the unipolar output signal of said analog processing means and converting each sample to digital form; and digital pattern recognition circuitry to detect changes in cutting noise due to tool break events that can damage the workpiece or machine tool;

said digital circuitry comprising means for calculating the running mean signal level of a selected number of samples, a transient detector to compare each new sample with the running mean and detect abrupt increases and decreases in signal level that may be the result of such a tool break event, and means for testing for a persistent shift in mean signal level that remains outside amplitude acceptance limits for a preset confirmation period after triggering by said transient detector, and generating a tool break alarm.

8. The system of claim 7 wherein said last-mentioned means returns control to said transient detector after failing the persistent mean shift test.

9. The system of claim 7 wherein each new sample after the trigger and detection of an abrupt change in signal level is compared with the mean signal level at the time of the trigger.

10. The system of claim 7 wherein said confirmation period is longer than the spindle revolution period of said machine tool to prevent false alarms on alternate metal-cutting and air-cutting on rough workpiece surfaces.

11. The method of detecting tool breakage capable of damaging the workpiece or machine tool comprising:

sensing vibrations at the tool-workpiece interface and converting these and other machine tool vibrations to an electrical signal;

preprocessing said vibration signal to discriminate against lower frequency machinery noise and rectify and low-pass filter said signal to detect the signal energy in an acoustic frequency band below 100 KHz;

sampling the processed vibration signal and converting each sample to digital form; and analyzing said signal samples in only two basic phases to detect changes in cutting conditions due to tool break events capable of damage, the first phase comprising detecting an abrupt increase or decrease in signal level that may be a cutting noise change by comparing every sample with the running mean signal level of N previous samples, the second phase comprising testing for a shift in cutting noise that persists for a minimum confirmation period by continually comparing the mean signal level against amplitude acceptance limits, and generating a tool break alarm when outside said limits, otherwise dismissing and returning control to the first phase.

12. The method of claim 11 wherein said confirmation period is longer than the spindle revolution period of said machine tool to prevent runout false alarms.

* * * * *